(12) United States Patent
Liu et al.

(10) Patent No.: US 7,538,588 B2
(45) Date of Patent: May 26, 2009

(54) DUAL-FUNCTION DRIVERS

(75) Inventors: Wen-Bo Liu, BeiJing (CN); Yu-Feng Cheng, BeiJing (CN); Ken-Ming Li, Taipei (TW); Vai-Hang Au, Taipei (TW)

(73) Assignee: Via Technologies, Inc., Taipei (TW)

( * ) Notice: Subject to any disclaimer, the term of this patent is extended or adjusted under 35 U.S.C. 154(b) by 446 days.

(21) Appl. No.: 11/556,217

(22) Filed: Nov. 3, 2006

(65) Prior Publication Data
US 2007/0127518 A1 Jun. 7, 2007

Related U.S. Application Data

(60) Provisional application No. 60/735,635, filed on Nov. 10, 2005.

(51) Int. Cl.
*H03K 3/00* (2006.01)
(52) U.S. Cl. .......................... 327/108; 327/112; 326/83
(58) Field of Classification Search ................ 327/108, 327/112; 326/82, 83, 86
See application file for complete search history.

(56) References Cited

U.S. PATENT DOCUMENTS 6,590,432 B1 * 7/2003 Wu et al. ..................... 327/108
6,696,852 B1 * 2/2004 Brunolli ....................... 326/30
7,253,663 B2 * 8/2007 Cho et al. .................... 326/115
7,256,625 B2 * 8/2007 Liu et al. ..................... 327/112

* cited by examiner

*Primary Examiner*—Lincoln Donovan
*Assistant Examiner*—Hai L. Nguyen
(74) *Attorney, Agent, or Firm*—Thomas, Kayden, Horstemeyer & Risley

(57) ABSTRACT

Dual-function drivers capable of outputting LVDS or TMDS differential signals by sharing output terminals under differential modes. In the dual-function driver, an input control unit receives a first input signal compliant with a first specification in a first mode and a second input signal compliant with a second specification in a second mode by sharing a pair of input terminals, and a current steering circuit comprises first and second differential pairs. The input control unit enables the first and second differential pairs to output a first differential signal compliant with the first specification through a pair of output terminals during the first mode, and the input control unit disables the first differential pair and enables the second differential pair to output a second differential signal compliant with the second specification on the pair of output terminals during the second mode.

20 Claims, 11 Drawing Sheets

DUAL-FUNCTION DRIVERS

CROSS REFERENCE TO RELATED APPLICATIONS

This application claims the benefit of U.S. Provisional Application No. 60/735,635, filed on Nov. 10, 2005.

BACKGROUND OF THE INVENTION

1. Field of the Invention

The invention relates to output drivers, and in particular to dual-operation drivers capable of outputting differential signals compliant with low voltage differential signaling (LVDS) specification or transmission minimized differential signaling (TMDS) specification under differential modes.

2. Description of the Related Art

Low Voltage Differential Signaling (LVDS) is a high-speed, low power interface used in most notebook computers to create a direct digital connection between the central processing unit (CPU) and LCD display. It provides very high line transmission rate, requires little power and generates low noise. LVDS technology, while optimized for short cable runs, fails when applied to transition LVDS technology to external desktop monitors.

FIG. 1A is a diagram of output driver 141 and a corresponding input unit 181 of a receiver (not shown). As shown, the LVDS output driver 141 is a current mode line driver, creating a differential voltage at the input unit 182 of the receiver 18 by current steering. For example, the current Iref flows to ground through the signal line 19, the terminal impedance 2RT about 100Ω and the signal line /19 by turning on switches A and the switches B off, and vice versa.

Transition Minimized Differential Signaling (TMDS) is an electrical standard used to transmit digital data to a display. The signal is optimized to reduce electromagnetic interference (EMI), which allows faster signal transfer with increased accuracy. The differential circuitry in TMDS allows complimentary limited amplitude signals to be transmitted over twisted pair wires rather than more expensive coaxial cable. The LVDS transmitter encodes and serially transmits a data stream over a TMDS link to a TMDS receiver. Video and sync information are serialized and sent over three sets of twisted pair wires, with an additional pair of wires transmitting a clock signal for timing.

As shown in FIG. 1B, the TMDS output driver 142 is a current mode line driver, generating a differential signal over lines 191 and /191 by controlling the switches D and /D. For example, when the switch D is turned on, the current Idr on line 191 pulls down the voltage at the node N1 of the input device 184 in a TMDS receiver 18' through the terminal impedance RT of about 50Ω. The other line /191, which carries no current at this time, is maintained at Avcc (3.3V), thus a differential voltage swing is achieved.

Currently, separate LVDS and TMDS transmitters in different chips are required for transmitting LVDS signals and TMDS signals.

BRIEF SUMMARY OF THE INVENTION

A detailed description is given in the following embodiments with reference to the accompanying drawings.

Embodiments of dual-function drivers are provided, in which a current steering circuit comprises first, second, third and fourth transistors, and a control unit receives a first input signal compliant with a low voltage differential signaling (LVDS) specification in a first mode and a second input signal compliant with a transmission minimized differential signaling (TMDS) specification in a second mode by sharing a pair of input terminals. The input control unit controls the first, second, third and fourth transistors to act as a LVDS driver to output a first differential signal compliant with the LVDS specification through a pair of output terminals according to the first input signal during the first mode, and turns off the first and second transistors and controls the third and fourth transistors to act as a TMDS driver outputting a second differential signal compliant with the TMDS specification through the pair of output terminals according to the second input signal during the second mode. Wherein the first, second, third and fourth transistors are enabled to output a first differential signal compliant with a first specification through the output terminals according to a first input signal compliant with the first specification in a first mode, and in a second mode, the first and transistors are disabled and the third and fourth transistors are enabled to output a second differential signal compliant with a second specification through the output terminals according to a second input signal compliant with the second specification. Wherein the first and second specifications are low voltage differential signaling (LVDS) and transmission minimized differential signaling (TMDS) specifications for digital visual interface (DVI)

The invention also provides an embodiment of dual-function drivers, in which an input control unit receives a first input signal compliant with a first specification in a first mode and a second input signal compliant with a second specification in a second mode by sharing a pair of input terminals, and a current steering circuit comprises first and second differential pairs. The input control unit enables the first and second differential pairs to output a first differential signal compliant with the first specification through a pair of output terminals during the first mode, and the input control unit disables the first differential pair and enables the second differential pair to output a second differential signal compliant with the second specification on the pair of output terminals during the second mode. Wherein the first and second transistors are PMOS transistors and the third and fourth transistors are NMOS transistors.

The invention also provides an embodiment of dual-function drivers, in which a first transistor comprises a first terminal coupled to a first node, a control terminal coupled to a first input terminal, and a second terminal coupled to one of a pair of output terminals. A second transistor comprises a first terminal coupled to the first node, a control terminal coupled to a second input terminal and a second terminal coupled to the other of the pair of output terminals. A third transistor comprises a first terminal coupled to the second terminal of the first transistor, a control terminal coupled to the first input terminal, and a second terminal coupled to a second node. A fourth transistor comprises a first terminal coupled to the second terminal of the second transistor, a control terminal coupled to the second input terminal, and a second terminal coupled to the second node. First and second gate controllers are coupled to gate terminals of the first and second transistors respectively. First, second, third, and fourth buffers are respectively coupled between the gate terminal of the first transistor and the first input terminal, between the gate terminal of the second transistor and the second input terminal, between the gate terminal of the third transistor and the first input terminal and between the gate terminal of the fourth transistor and the second input terminal. Wherein the first differential pair comprises PMOS transistors and the second differential pair comprises NMOS transistors.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Output drivers in LVDS transmitters different from output drivers in TMDS transmitters, in that, for example, no reference voltage is required at corresponding receivers for output drivers in the LVDS transmitters, and the common mode voltage (Vcm) determined by the LVDS transmission unit is typically 1.25V. A stable reference voltage Avcc is required at corresponding receivers for output drivers in the TMDS transmitter, the stable reference voltage Avcc being typically 3.3V and common mode voltage 3V. Moreover, output differential voltage swing of the output drivers in the LVDS transmitters is from 250 mV to 450 mV around common mode voltage Vcm. Output differential voltage swing of the output drivers in the LVDS transmitters is from 400 mV to 600 mV. Different common mode voltages, however, generate incompatibility when the LVDS and TMDS transmitters directly share the output terminals without modifying structures of the output drivers in LVDS and TMDS transmitters, as follows.

Figure 1A:
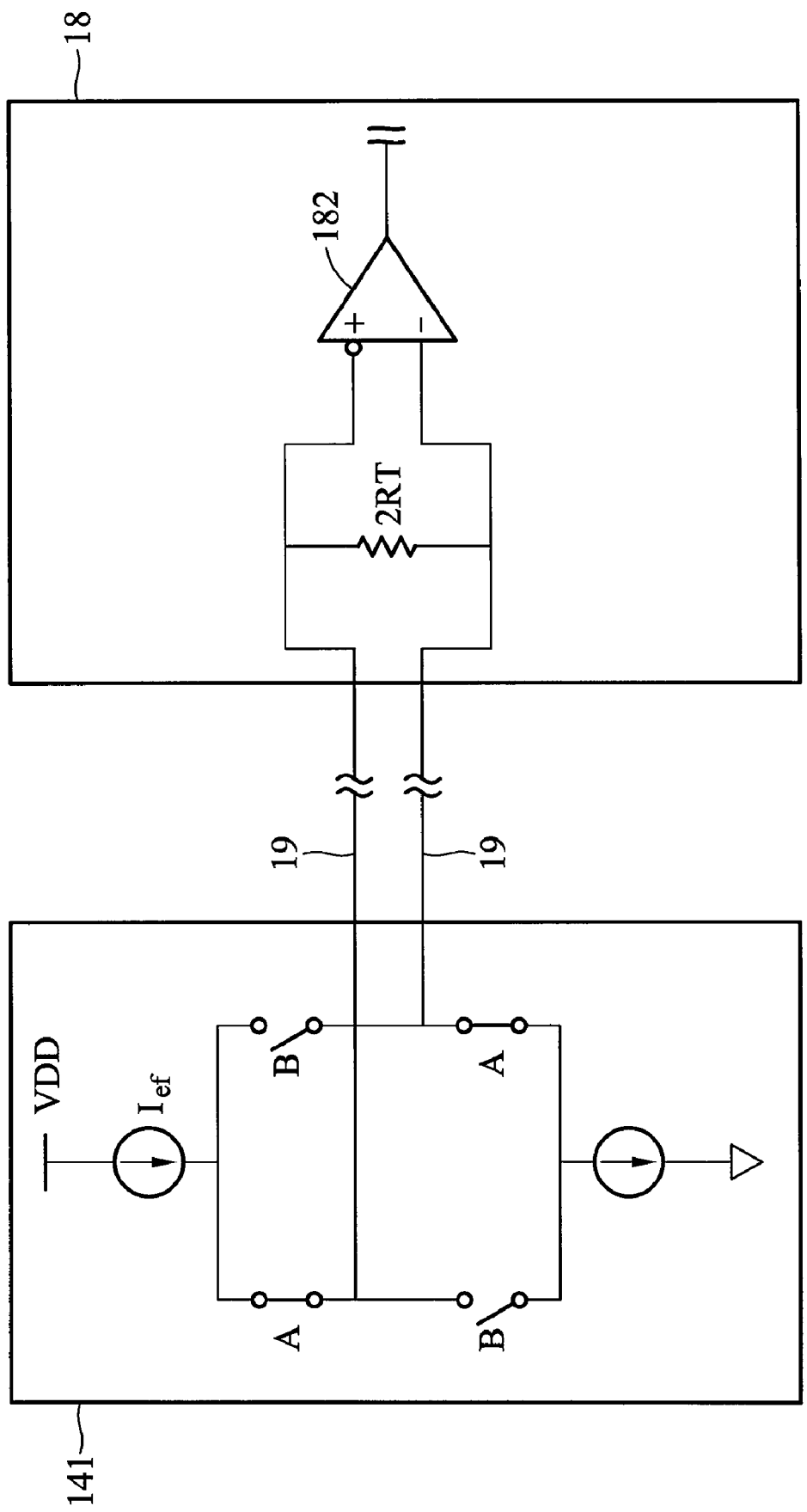
FIG. 1A shows an output driver in conventional LVDS transmitter and a corresponding input unit thereof.
Figure 1B:
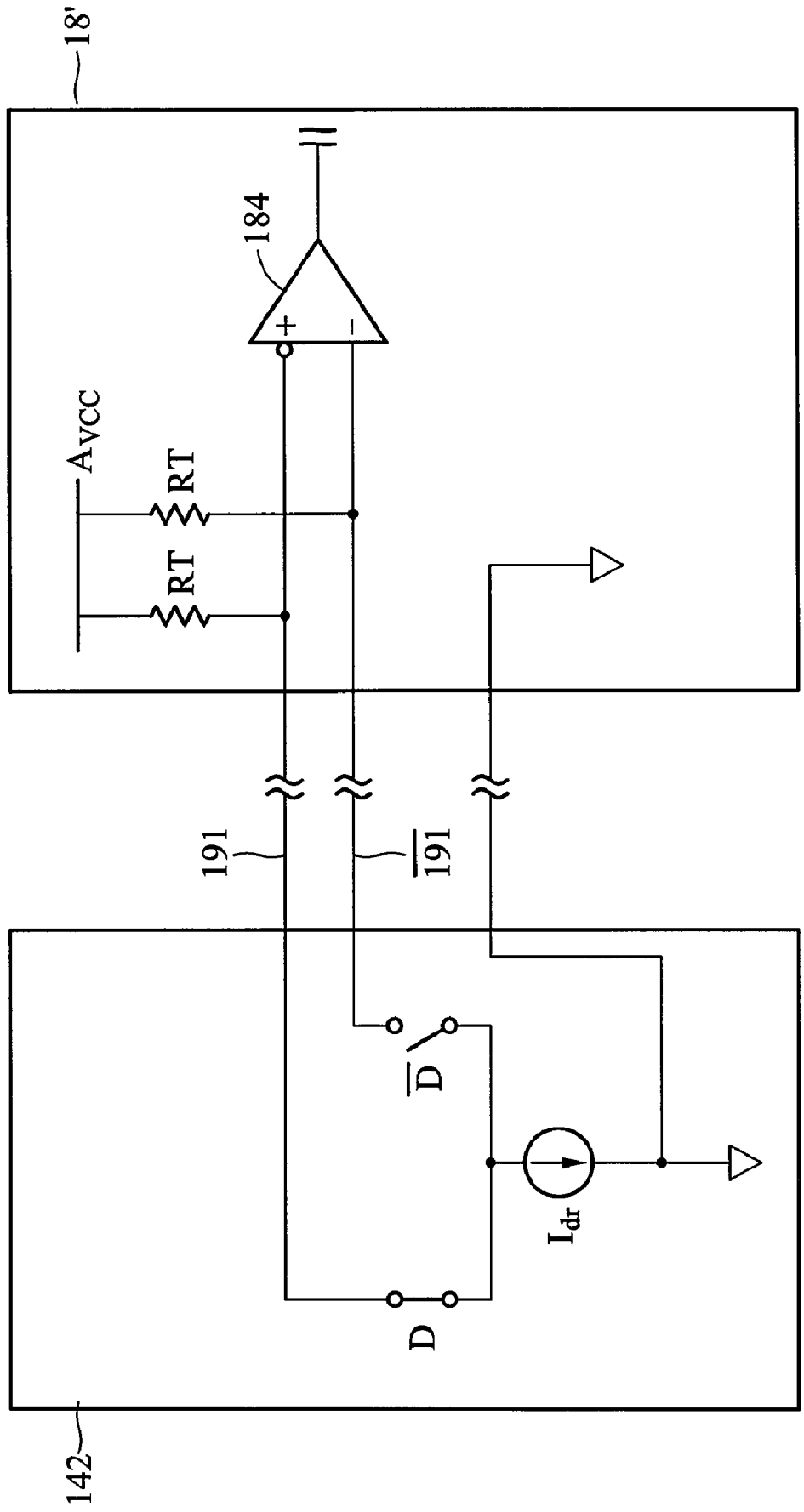
FIG. 1B shows an output driver in conventional TMDS transmitter and a corresponding input unit thereof.
Figure 2:
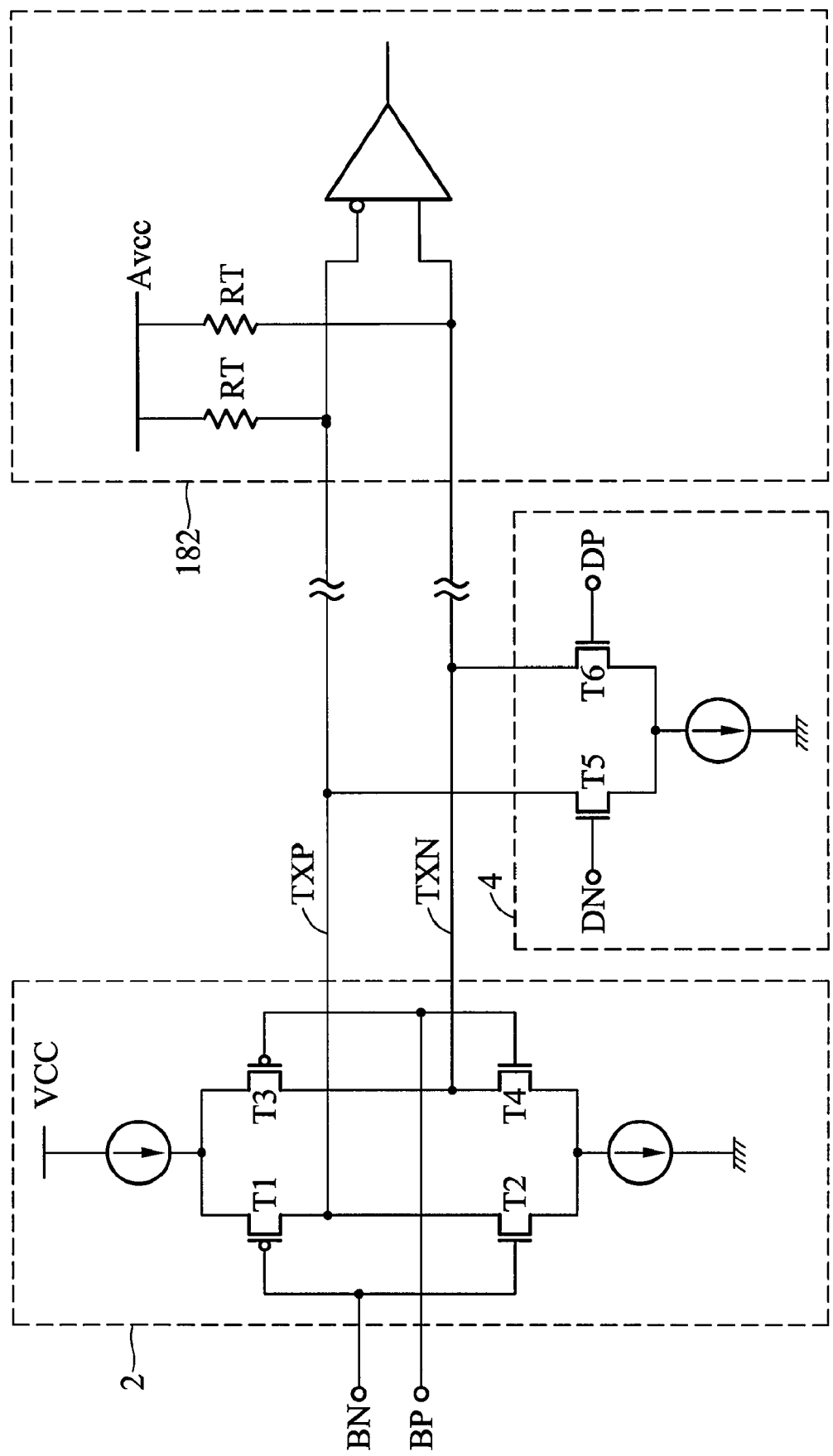
FIG. 2 shows a combination of conventional output drivers in LVDS and LVDS transmitters known to the inventors.

FIG. 2 shows a combination of conventional output drivers in LVDS and LVDS transmitters known to the inventors. This are not prior art for purposes of determining the patentability of the invention rather merely showing a problem found by the inventors.

As shown, the power source VCC in the output driver 2 for LVDS transmitter is typically 2.5V. The common mode voltage Avcc in input unit 182 of the external receiver is typically 3V. In TMDS mode, the output driver 2 is disabled and the output driver 4 for TMDS transmitter is enabled, voltages on the input terminals BP and BN are both high (2.5V), and one of the signal lines TXP and TXN is pulled down to 2.7V from 3.3V according to the signals DN and DP. The voltages on the signal lines TXP and TXN, however, are higher than those on terminals BN and BP and power source VCC in the output driver 2. Thus, leakage current may flow to the power source VCC in the output driver 2 through the PMOS transistors T1 and T3, decreasing the output differential swing of the output driver 4. Further, if MOS transistors T1~T6 are all 2.5V devices, device breakdown may occur due to the voltages on the signal lines TXP and TXN.

To address the problems caused by leakage current, embodiments of the invention provide a dual-function drive capable of outputting differential signals compliant with low voltage differential signaling (LVDS) specification or transmission minimized differential signaling (TMDS) specification under differential modes.

Figure 3A:
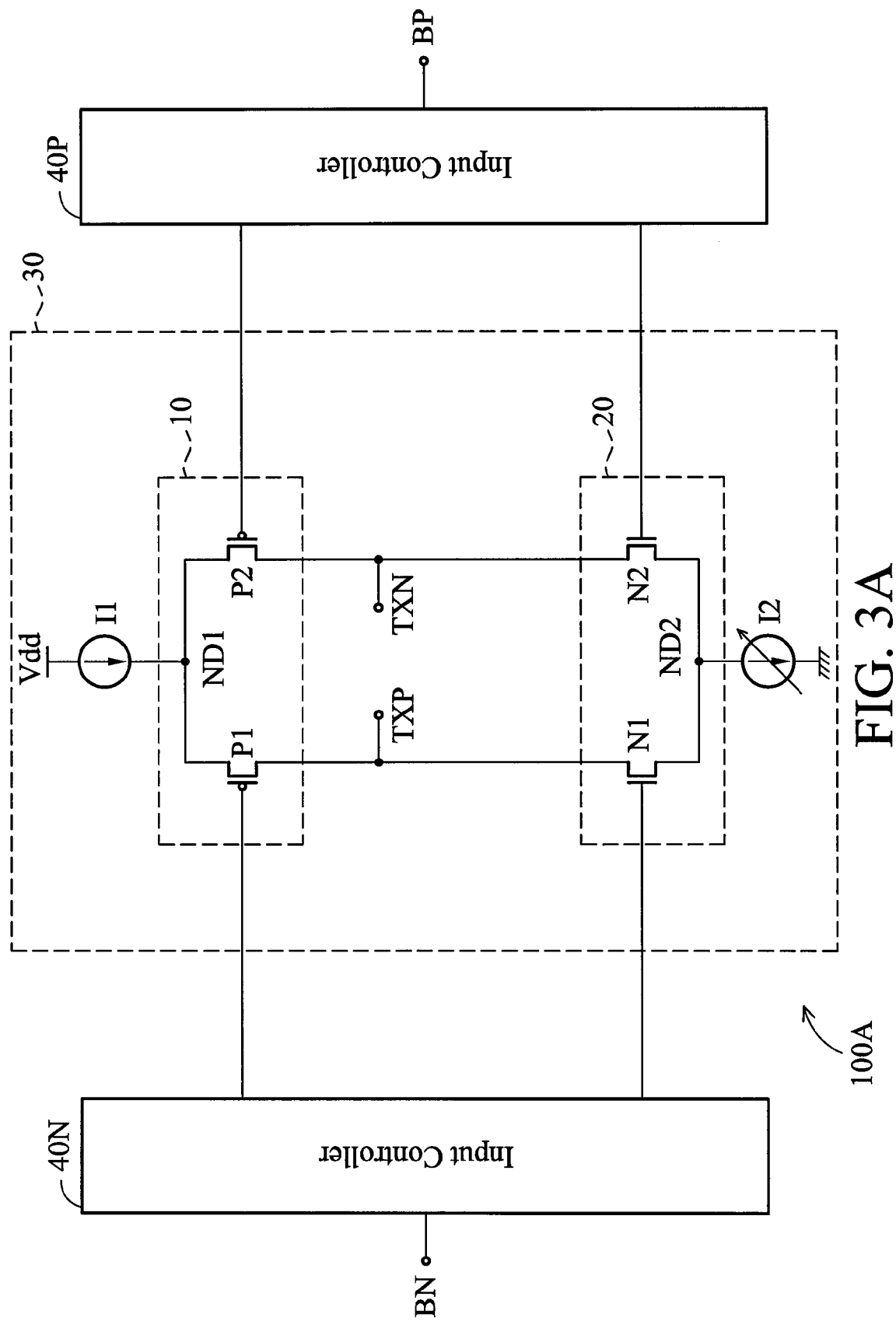
FIG. 3A shows an embodiment of a dual-function drive of the invention.

FIG. 3A shows an embodiment of a dual-function drive 100 of the invention, comprising a current steering circuit 30 and an input control unit comprising two input controllers 40N and 40P.

The current steering circuit 30 comprises a fixed current source I1, a first differential pair 10, a second differential pair 20 and a selectable current source I2, in which the selectable current source I2 can provide different currents in different modes. For example, the selectable current source I2 can provide 3.6 mA for LVDS mode and 12.0 mA for TMDS mode respectively. The first differential pair 10 comprises transistors P1 and P2, the transistor P1 comprises a first terminal coupled to a node ND1, a control terminal coupled to the input controller 40N and a second terminal coupled to the output terminal TXP. The transistor P2 comprises a first terminal coupled to the node ND1, a control terminal coupled to the input controller 40P and a second terminal coupled to the output terminal TXN. The second differential pair 20 comprises transistors N1 and N2, the transistor N1 comprises a first terminal coupled to a node ND2, a control terminal coupled to the input controller 40N and a second terminal coupled to the output terminal TXP. The transistor N2 comprises a first terminal coupled to the node ND2, a control terminal coupled to the input controller 40P and a second terminal coupled to the output terminal TXN.

The input controllers 40N and 40P (input control unit) receive a first input signal compliant with low voltage differential signaling (LVDS) specification in LVDS mode and a second input signal compliant with transmission minimized differential signaling (TMDS) specification in TMDS mode by sharing a pair of input terminals BP and BN. In LVDS mode, the input controllers 40N and 40P control the first and second differential pairs 10 and 20 to act as a LVDS driver outputting a differential signal compliant with LVDS specification through a pair of output terminals TXP and TXN in response to the input signal on the input terminals BP and BN. In TMDS mode, the input controllers 40N and 40P turn the first differential pair 10 off and the second differential pair 20 on to act as a TMDS driver outputting a differential signal compliant with TMDS specification through the output terminals TXN and TXP in response to the input signal on the input terminals BN and BP.

Figure 3B:
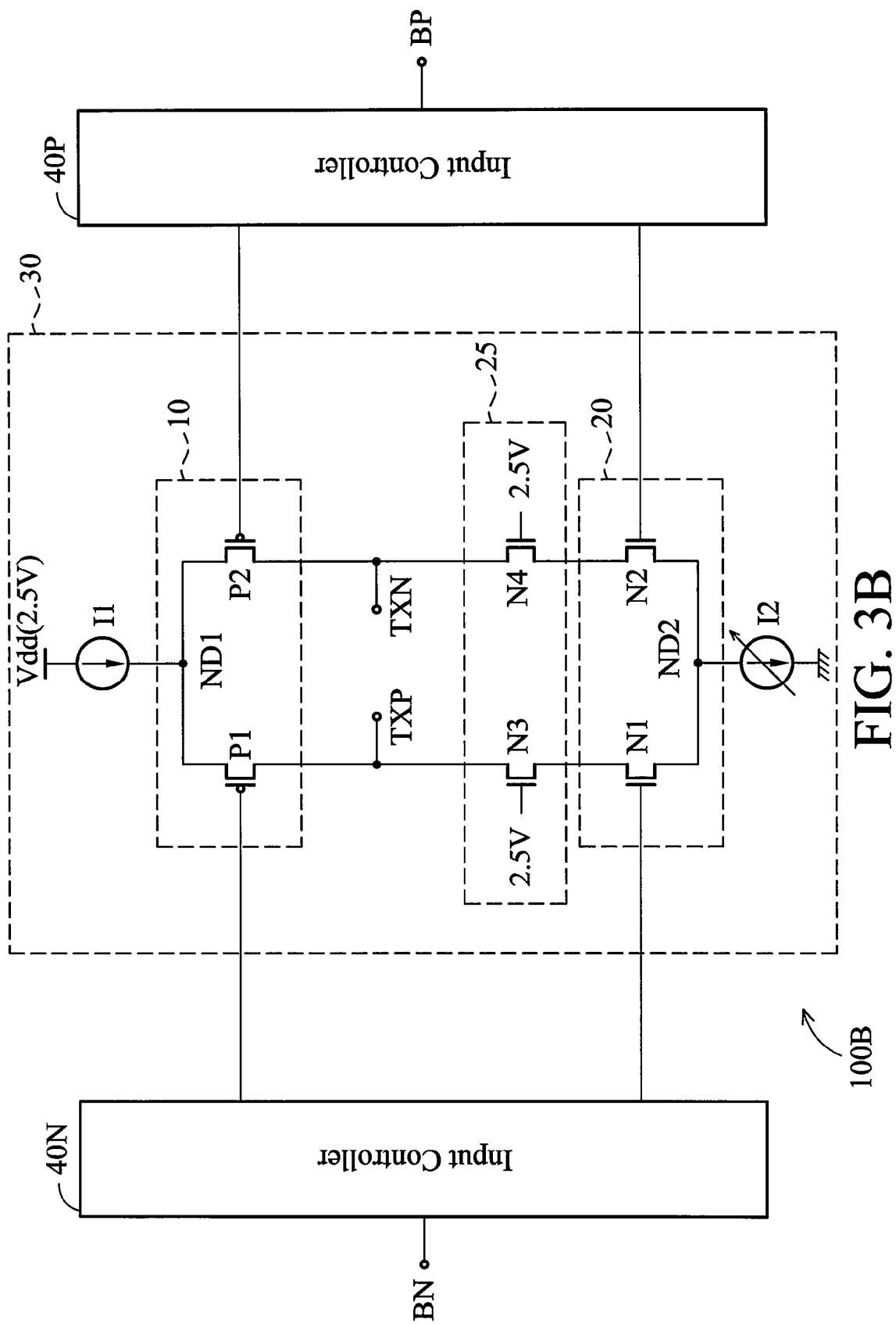
FIG. 3B shows another embodiment of a dual-function driver.

FIG. 3B shows another embodiment of a dual-function driver. As shown, the dual-function driver 100B is similar to that shown in FIG. 3A, except that a clamping device 25 is coupled between the output terminals TXP and TXP and the second differential pair 20, serving as a protection circuit for the second differential pair 20. In the embodiment, the clamping device 25 comprises transistors N3 and N4 with gate terminals coupled to a power voltage of 2.5V, such that the second differential pair 20 is not stressed by external power voltage, such as 3.3V, directly. For example, the clamping device 25 can lower voltage on the drain terminals of the transistor N1 and N2 to below 2.5V, and thus, device breakdown can be prevented. Operation and structure are similar to those shown in FIG. 3A and thus are omitted for simplification.

Figure 3C:
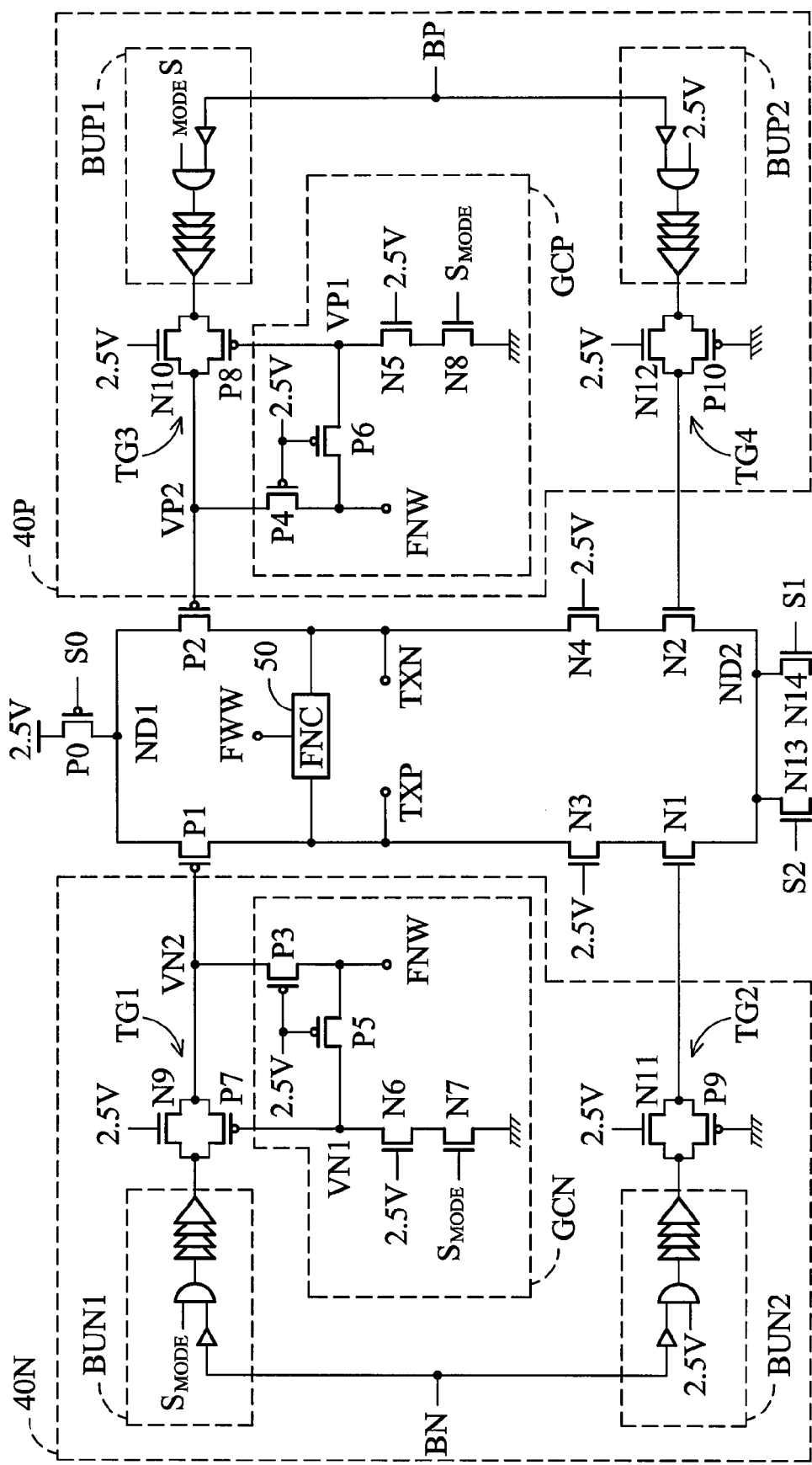
FIG. 3C shows another embodiment of a dual-function driver.

FIG. 3C shows another embodiment of a dual-function driver. As shown, the first and second differential pairs (10 and 20) and the clamping device 25 are similar to those shown in FIG. 3B.

As shown, transistor P0 is coupled between the power voltage 2.5V and the node ND1, controlled by a signal S0, such as 0V, serving as the fixed current source I1 shown in FIGS. 3A and 3B. Transistors N13 and N14 are coupled between the power voltage 0V and the node ND2, controlled by signal S1 and S2 respectively and serve as the selectable current source I2 shown in FIGS. 3A and 3B. For example, in LVDS mode, the transistor N13 is turned on and transistor N14 is off to provide a current of 3.6 mA, and the transistors N13 and N14 are both turned on to provide 12.0 mA in TMDS mode. The current steering circuit shown in FIG. 3C further comprises a well controller 50 coupled to n-well FNW of all PMOS transistors in the dual-function driver 100C, charging n-well FNW of the PMOS transistors based on the power voltage of 2.5V or an external power voltage of 3.3V on the output terminals TXN and TXP.

The input controllers 40N and 40P each comprise a gate controller, two transmission gates and two buffers. In input controller 40N, the buffer BUN1 is coupled between the input terminal BN and control terminal of the transistor P1 through the transmission gate TG1 comprising the transistors N9 and P7. The buffer BUN2 is coupled between the input terminal BN and the control terminal of the transistor N1 through the transmission gate TG2 comprising the transistors N11 and P9. The gate controller GCN is coupled to the control terminal of the transistor P1, and comprises transistors P3, P5 and N6, N7.

The transistor P3 comprises a first terminal coupled to the control terminal of the transistor P1, a second terminal coupled to the n-well FNW, and a control terminal coupled to the power voltage of 2.5V. The transistor P5 comprises a first terminal coupled to the n-well FNW, a control terminal coupled to the power voltage of 2.5V, and a second terminal coupled to the transistor P7. The transistor N6 comprises a first terminal coupled to the control terminal of the transistor P7, a control terminal coupled to the power voltage of 2.5V, and a second terminal coupled to the transistor N7. The transistor N7 comprises a first terminal coupled to the second terminal of the transistor N6, a second terminal coupled to the power voltage of 0V (ground voltage), and a control terminal coupled to a mode selection signal $S_{MODE}$.

In input controller 40P, the buffer BUP1 is coupled between the input terminal BP and control terminal of the transistor P2 through the transmission gate TG3 comprising the transistors N10 and P8. The buffer BUP2 is coupled between the input terminal BP and the control terminal of the transistor N2 through the transmission gate TG4 comprising the transistors N12 and P10. The gate controller GCP is coupled to the control terminal of the transistor P2, and comprises transistors P4, P6, N5 and N8.

The transistor P4 comprises a first terminal coupled to the control terminal of the transistor P2, a second terminal coupled to the n-well FNW, and a control terminal coupled to the power voltage of 2.5V. The transistor P6 comprises a first terminal coupled to the n-well FNW, a control terminal coupled to the power voltage of 2.5V, and a second terminal coupled to the transistor P8. The transistor N5 comprises a first terminal coupled to the control terminal of the transistor P8, a control terminal coupled to the power voltage of 2.5V, and a second terminal coupled to the transistor N8. The transistor N8 comprises a first terminal coupled to the second terminal of the transistor N5, a second terminal coupled to the power voltage of 0V (ground voltage), and a control terminal coupled to the mode selection signal $S_{MODE}$.

Figure 4:
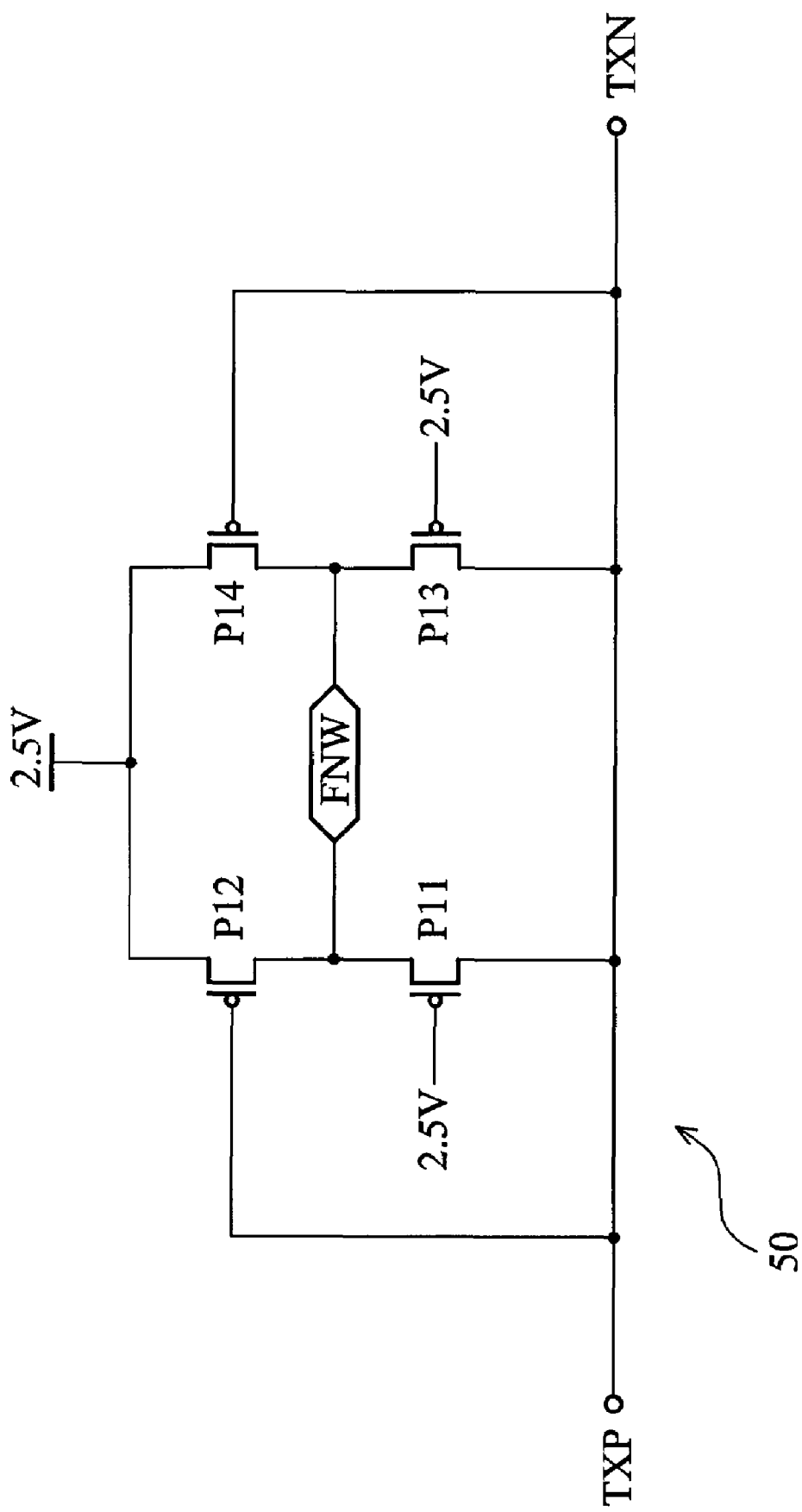
FIG. 4 shows an embodiment of a well controller.

FIG. 4 shows an embodiment of a well controller 50, comprising four PMOS transistors P11~P14, charging n-well FNW of the PMOS transistors based on the power voltage of 2.5V or an external power voltage of 3.3V on the output terminals TXN and TXP. The transistor P11 comprises a first terminal coupled to the output terminal TXP, a control terminal coupled to the power voltage of 2.5V, and a second terminal coupled to the n-well FNW of PMOS transistors in dual-function driver 100C. The transistor P12 comprises a first terminal coupled to the n-well FNW, a control terminal coupled to the output terminal TXP and a second terminal coupled to the power voltage of 2.5V. The transistor P13 comprises a first terminal coupled to the output terminal TXN, a control terminal coupled to the power voltage of 2.5V, and a second terminal coupled to the n-well FNW. The transistor P14 comprises a first terminal coupled to the n-well, a control terminal coupled to the output terminal TXN and a second terminal coupled to the power voltage of 2.5V. Wherein the first terminal of the transistor P12 is coupled to the second terminal of the transistor P11, and the first terminal of the transistor P14 is coupled to the second terminal of the transistor P13.

Operation of the dual-function driver 100C is described as follows with reference to FIG. 3C and FIG. 4.

Condition 1: LVDS mode ($S_{MODE}$ is high, such as 2.5V)

In selectable current source, the transistor N13 is turned on and the transistor N14 is turned off, providing the required 3.6 mA current to achieve 360 mV voltage swing between the output terminals TXN and TXP. Because the mode selection signal $S_{MODE}$ is high, all buffers BUN1, BUN2, BUP1 and BUP2 are enabled to transmit signals on the input terminals BN and BP to the transmission gates TG1~TG4. The transistors N3 and N4 are always turned on due to the power voltage of 2.5V on gate terminals thereof.

Meanwhile, the transistors N5~N8 are turned on as the mode selection signal $S_{MODE}$ is high, pulling the voltage VP1 and VN1 to ground (0V), and thus, the transmission gates TG1 and TG3 are enabled. Because control terminals of the transistors N11 and N12 are coupled to 2.5V and that of the transistors P9 and P10 are coupled to ground, the transmission gates TG2 and TG4 are always enabled. Namely, the transmission gates TG1~TG4 are all enabled in this mode, and the signals, for example 7 bit of LVDS data signals, on the input terminals BN and BP are transmitted to switch the transistors P1~P2 and N1~N2. It should be noted that the transistors P3~P6 have no effect on the transmission in this mode, because 2.5V is coupled to gate terminals thereof.

The transistors P1, P2, N1 and N2 are able to switch the current in response to the signals on the input terminals BN and BP. For example, if the signals on the input terminals BN and BP are low and high respectively, the transistors P1 and N2 are turned on and the transistors P2 and N1 are turned off, such that a 3.6 mA current flows to the corresponding external unit (not shown) through the output terminal TXP and back through the output terminal TXN, creating a differential voltage about 360 mV with common mode voltage of 1.25V at the output terminals TXN and TXP. Alternately, if the signals on the input terminals BN and BP are high and low respectively, the transistors P1 and N2 are turned off and the transistors P2 and N1 are turned on, such that a 3.6 mA current flows to the corresponding external unit (not shown) through the output terminal TXN and back through the output terminal TXP, thereby creating a differential voltage about 360 mV with common mode voltage of 1.25V at the output terminals TXN and TXP. Typically, the output terminals TXN and TXP typically swing between 1.07V~1.43V in LVDS mode.

In well controller 50, because the transistors P11 and P13 are always turned off and the transistors P12 and P14 are always turned on, the voltage of n-well FWN is pulled up to the power voltage of 2.5V when the output terminals TXN and TXP swing between 1.07V~1.43V. Thus, n-well FWN of all the PMOS transistors in FIG. 3C are pulled to 2.5V, and latch-up is prevented.

Condition 2: TMDS mode ($S_{MODE}$ is low, such as 0V)

In selectable current source, the transistors N13 and N14 are turned on, providing the required 12 mA current for TMDS transmission. Because the mode selection signal $S_{MODE}$ is low, the buffers BUN1 and BUP1 are disabled, and only the buffers BUN2 and BUP2 are enabled to transmit signals on the input terminals BN and BP to the transmission gates TG2 and TG4.

The transistors P1 and P2 are turned off and only transistors N1 and N2 are able to switch the current in response to the signals on the input terminals BN and BP. Namely, the signals, for example 10 bit of TMDS data signals, on the input terminals BN and BP are transmitted to switch the transistors N1~N2. For example, if the signals on the input terminals BN and BP are low and high respectively, the transistor N2 is turned on and the transistor N1 is turned off respectively, such that a 12 mA current flows from external 3.3V power supply to the transistor N2 through a receiver end resistor, for example the resistor RT shown in FIG. 2, thereby creating a 600 mV voltage below the external 3.3V power supply between the output terminals TXN and TXP. Namely, the voltages on the output terminals TXN and TXP are nearly 2.7V and 3.3V respectively.

Alternately, if the signals on the input terminals BN and BP are high and low respectively, the transistor N1 is turned on and the transistor N2 is turned off respectively, such that a 12 mA current flows from external 3.3V power supply to the transistor N1 through a receiver end resistor, for example the resistor RT shown in FIG. 2, thereby creating a 600 mV voltage below the external 3.3V power supply between the output terminals TXN and TXP. Namely, the voltages on the output terminals TXN and TXP are nearly 3.3V and 2.7V respectively.

Meanwhile, in well controller 50, because higher voltage (3.3V) on the output terminals TXN or TXP turns on the transistors P11 or P13, the n-well FNW is pulled to the external 3.3V power supply. Namely, the well controller 50 directs the n-well of the all PMOS transistors in FIG. 3C to always follow the higher power voltage on the output terminals TXN and TXP, thereby avoiding latch-up of PMOS transistors.

Because n-well FNW is pulled to 3.3V, the transistors P3, P4, P5 and P6 are turned on and voltages on the nodes VN1, VN2, VP1 and VP2 are pulled to 3.3V accordingly. As voltages on the nodes VN1, VN2 VP1 and VP2 are 3.3V, the transistors P1, P2, P7 and P8 are totally cut off, such that leakage current from the output terminal TXN to power voltage of 2.5V or from the output terminal TXN to power voltage of 2.5V is prevented. As the mode selection signal $S_{MODE}$ is low, the transistors N7 and N8 are turned off, and the transistors N5 and N6 are turned off due to 3.3V on the nodes VP1 and VN1, giving no effect on the voltages at nodes VN1 and VP1.

It should be noted that the voltages on the drain terminals of the transistors N1 and N2 are clamped below 2.5V by the clamping device, such that the voltage, nearly 3.3V, on the output terminals TXN or TXP does not stress the transistors N1 and N2 directly, preventing device breakdown.

Figure 5A:
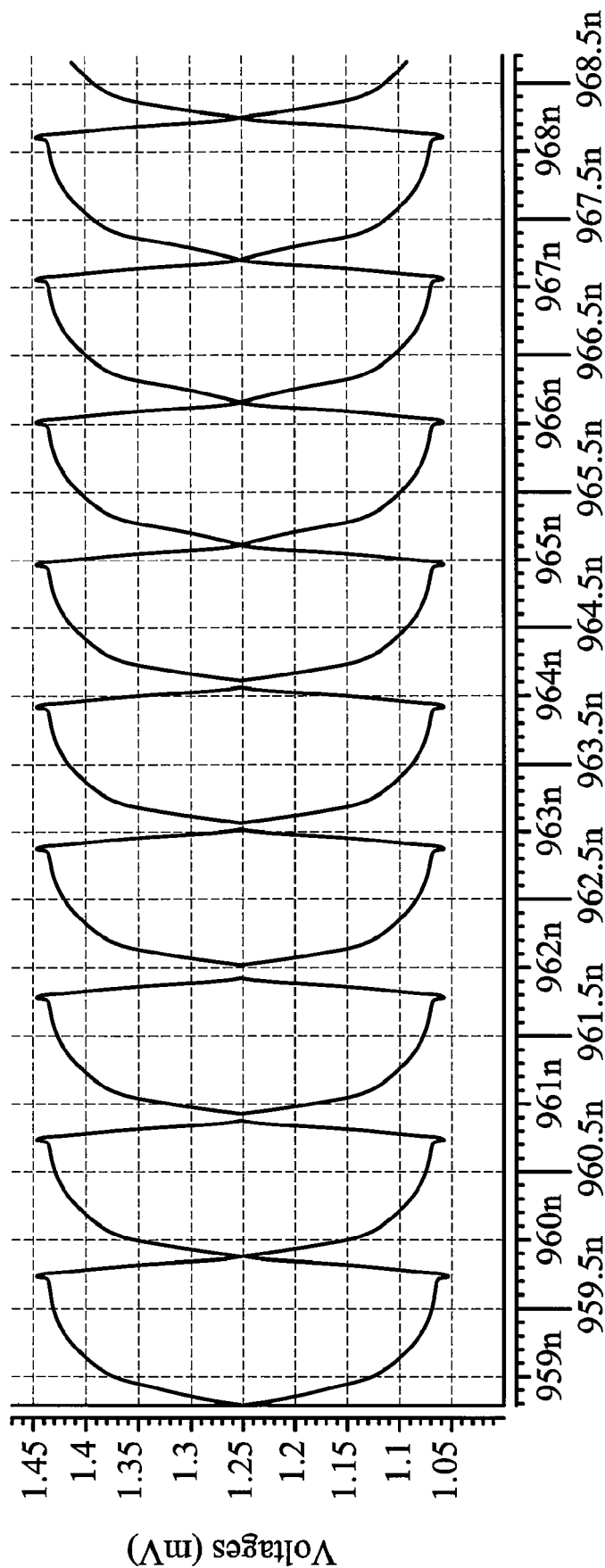
FIG. 5A is a wave diagram of output from the dual-function driver in LVDS mode.
Figure 5B:
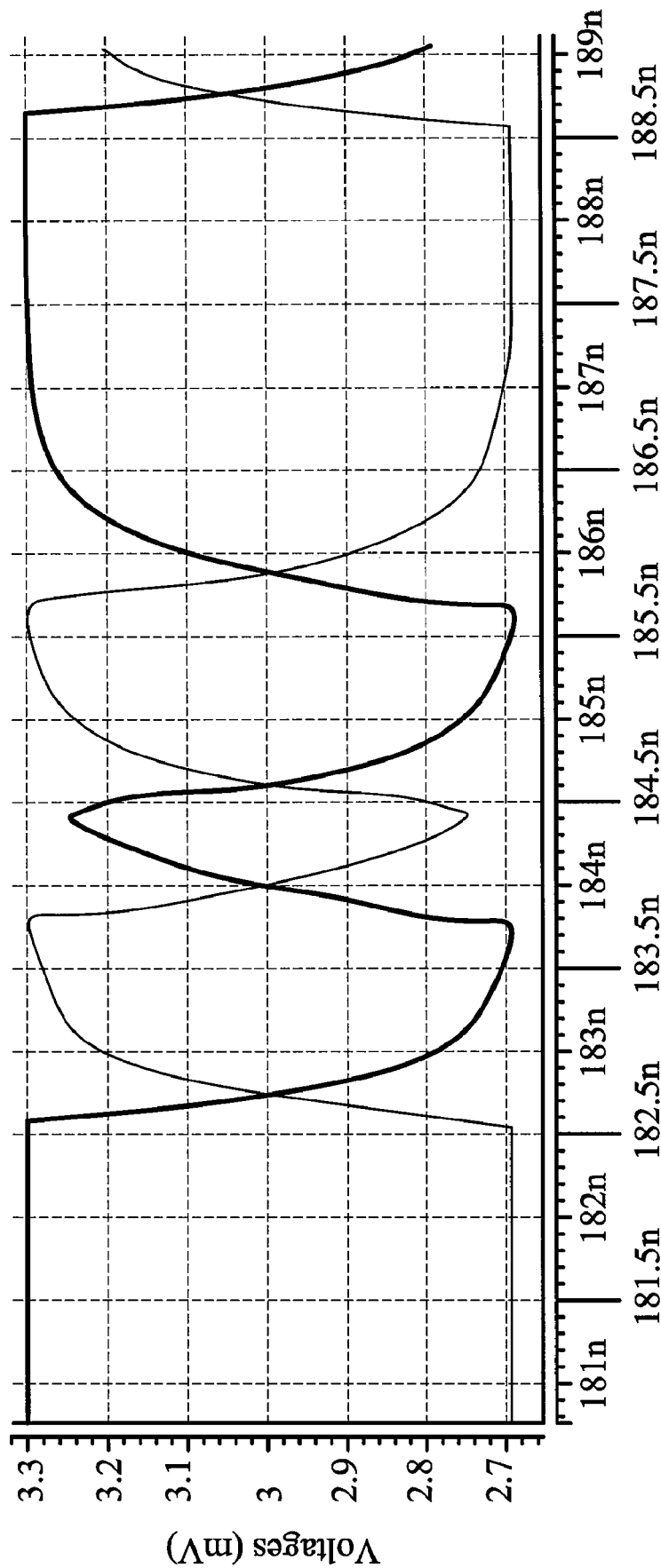
FIG. 5B is a wave diagram of output from the dual-function driver in TMDS mode.

FIG. 5A is a wave diagram of output from the dual-function driver in LVDS mode. As shown, 366 mV differential swing is reached and the common mode voltage is strictly constrained to 1.25V. FIG. 5B is a wave diagram of output from the dual-function driver in TMDS mode. As shown, the upper voltage is constrained to 3.3 power voltage. Thus, the dual-function driver can transmit LVDS signals in LVDS mode and TMDS signals in TMDS mode. Further, in the dual-function driver, leakage and device breakdown can also be prevented.

In the embodiment of the invention, the buffers BUN1, BUN2, BUP1 and BUP2 each comprise an inverter coupled to the input terminal, an AND gate coupled to the mode selection signal or the power voltage and four inverters coupled to the corresponding transmission gate. In the buffers BUN1 and BUP1, one input terminal of the AND gates are coupled to the mode selection signal, and one input terminal of the AND gates in buffers BUN2 and BUP2 are coupled to power voltage of 2.5V, such that the buffers BUN2 and BUP2 are enabled in both LVDS mode and TMDS mode, and the buffers BUN1 and BUP1 is only enabled in LVDS mode. It should be noted that the number of the inverters coupled to the transmission increases and the driving power thereof is increased, but the chip area and power consumption thereof are increased, generating a trade off.

Figure 6:
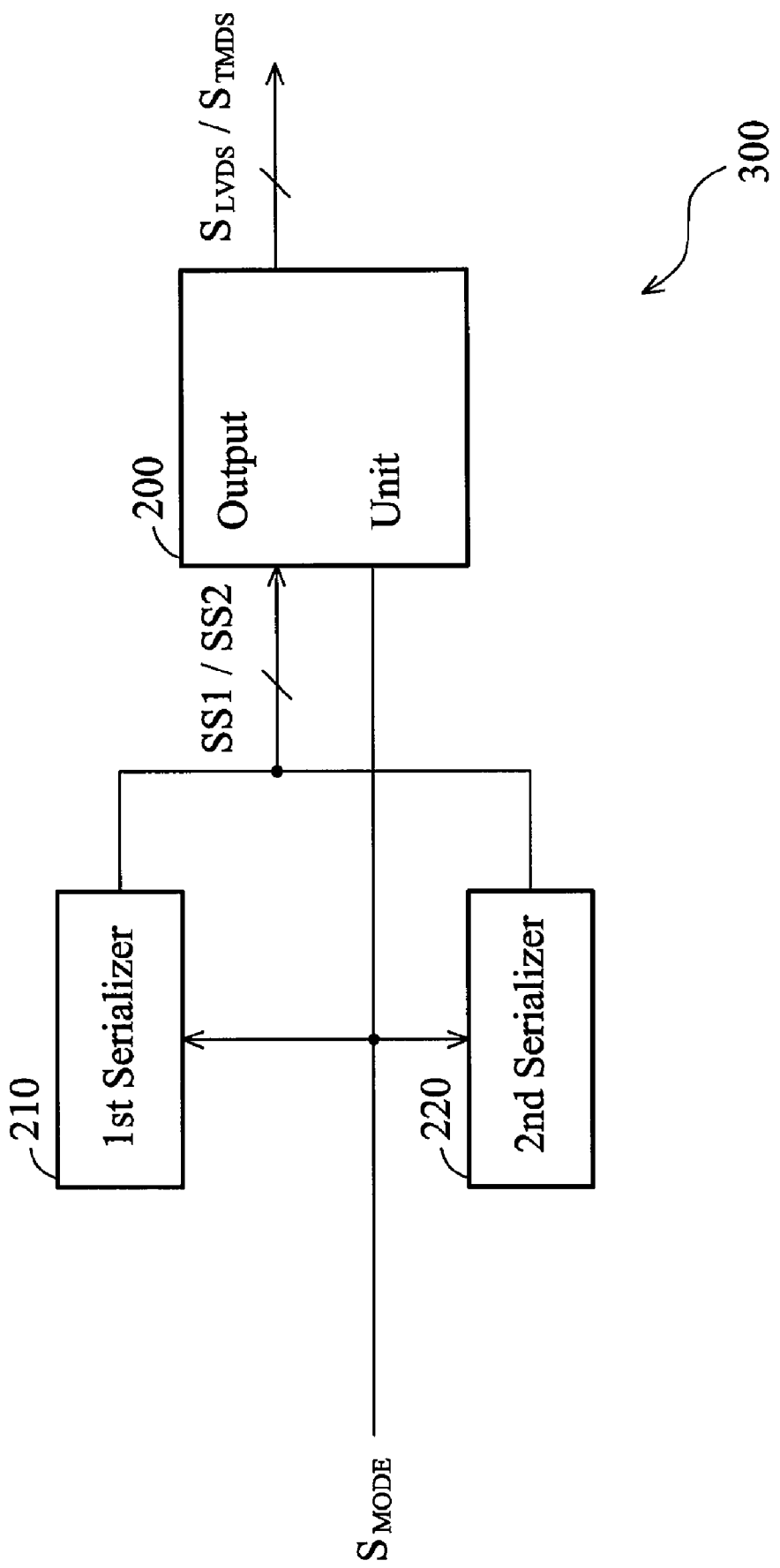
FIG. 6 shows an embodiment of a transmission unit.

FIG. 6 shows an embodiment of a transmission unit. The transmission unit 300 comprises a first serializer 210, a second serializer 220 and an output unit 200, in which the output unit 200 comprises a plurality of dual-function drivers 100A, 100B or 100C shown in FIGS. 3A~3C. The first serializer 210 outputs 7 bit of LVDS data signals SS1, and the second serializer 220 outputs 10 bit of TMDS data signals SS2. In LVDS mode, the output unit 200 outputs differential signals SLVDS compliant with the LVDS specification to a corresponding reception unit. In TMDS mode, the output unit 200 outputs differential signals $S_{TMDS}$ compliant with the TMDS specification to a corresponding reception unit.

Because drivers in output unit 200 can output differential signals compliant with LVDS specification or TMDS specification under differential modes, the transmission unit 300 can transmit signals to a TMDS receiver or a TMDS receiver by the same transmission cable without problems of incompatibility and device breakdown.

Figure 7:
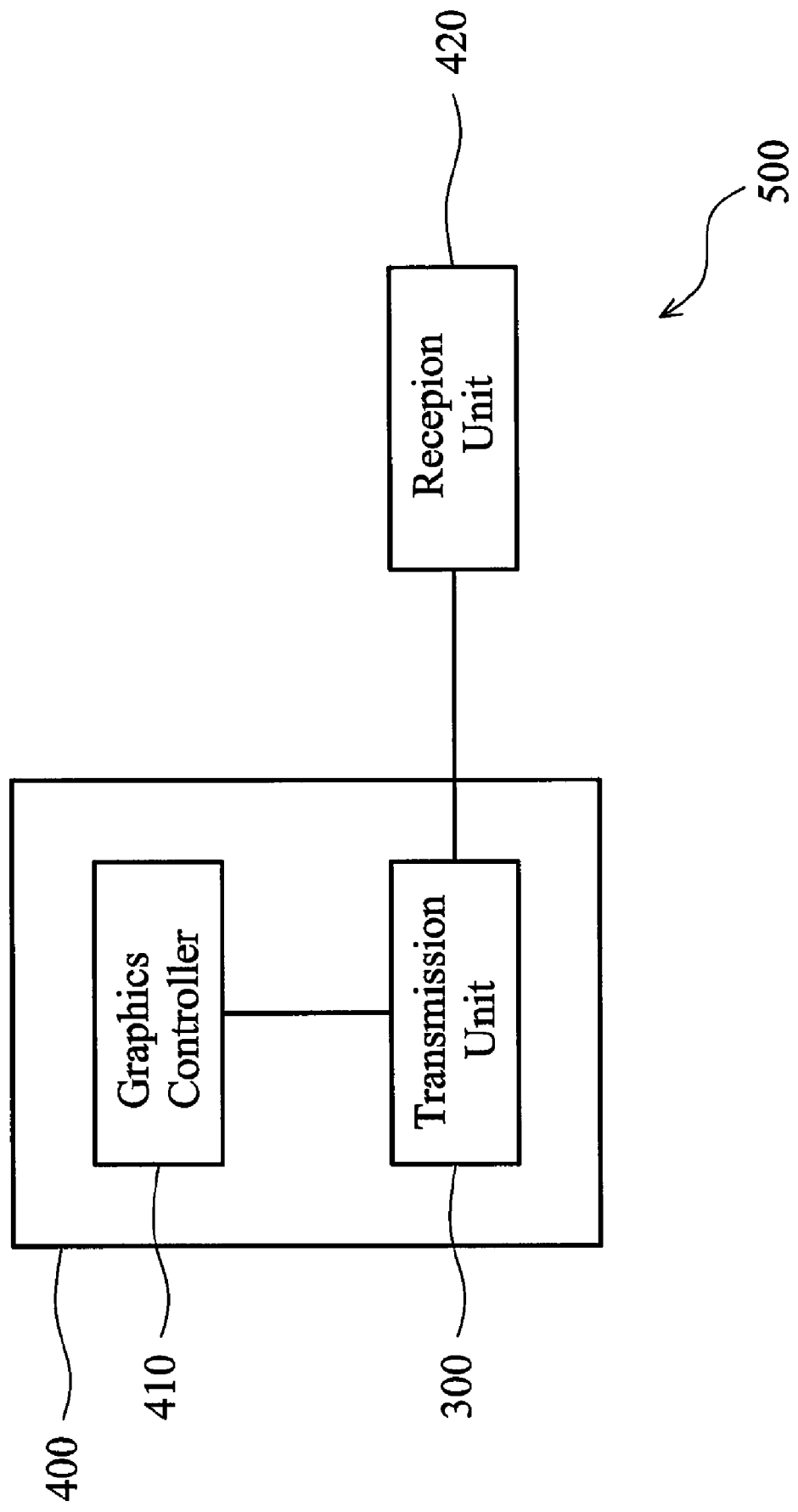
FIG. 7 shows an embodiment of a communication system.

FIG. 7 shows an embodiment of a communication system. As shown, the system 500 comprises the transmission unit 300 shown in FIG. 6, a graphics controller 410 and a reception unit 420. For example, the graphics controller 410 and the transmission unit 300 can be integrated on a printed circuit board, providing digital display data to the reception unit 420 through digital visual interface. The reception unit 420 receives the data from the transmission unit and can, for example, be a LVDS receiver or a TMDS receiver integrated on a display module, such as a LCD module, CRT, or a plasma display module, and the like.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A dual-function driver, comprising:
    a first transistor comprising a first terminal coupled to a first node, a control terminal coupled to a first input terminal, and a second terminal coupled to one of a pair of output terminals;

a second transistor comprising a first terminal coupled to the first node, a control terminal coupled to a second input terminal and a second terminal coupled to the other of the pair of output terminals;

a third transistor comprising a first terminal coupled to the second terminal of the first transistor, a control terminal coupled to the first input terminal, and a second terminal coupled to a second node;

a fourth transistor comprising a first terminal coupled to the second terminal of the second transistor, a control terminal coupled to the second input terminal, and a second terminal coupled to the second node;

first and second gate controllers coupled to gate terminals of the first and second transistors respectively; and first, second, third, and fourth buffers respectively coupled between the gate terminal of the first transistor and the first input terminal, between the gate terminal of the second transistor and the second input terminal, between the gate terminal of the third transistor and the first input terminal and between the gate terminal of the fourth transistor and the second input terminal;

wherein the first, second, third and fourth transistors are enabled to output a first differential signal compliant with a first specification through the output terminals according to a first input signal compliant with the first specification in a first mode, and in a second mode, the first and transistors are disabled and the third and fourth transistors are enabled to output a second differential signal compliant with a second specification through the output terminals according to a second input signal compliant with the second specification; and wherein the first and second specifications are low voltage differential signaling (LVDS) and transmission minimized differential signaling (TMDS) specifications for digital visual interface (DVI).

2. The dual-function driver as claimed in claim 1, further comprising first, second, third and fourth transmission gates respectively coupled between the gate terminal of the first transistor and the first buffer, between the gate terminal of the second transistor and the second buffer, between the gate terminal of the third transistor and the third buffer and between the gate terminal of the fourth transistor and the fourth buffer.

3. The dual-function driver as claimed in claim 1, further comprising a clamping device coupled between the pair of the output terminals and the first terminals of the third and fourth transistors.

4. The dual-function driver as claimed in claim 3, further comprising:
a fixed current source coupled between a first power voltage and the first node; and
a selectable current source coupled to a second power voltage and the second node, providing different currents in different mode.

5. The dual-function driver as claimed in claim 4, wherein the fixed current source comprises a fifth transistor coupled between the first power voltage and the first node and controlled by a first signal and the selectable current source comprises sixth and seventh transistors coupled between the second power voltage and the second node and controlled by second and third control signals respectively.

6. The dual-function driver as claimed in claim 1, wherein the first and second transistors are PMOS transistors and the third and fourth transistors are NMOS transistors.

7. The dual-function driver as claimed in claim 6, further comprising a well controller coupled to the first and second transistors, charging an n-well of the first and second transistors based on the first power voltage or an external power voltage exceeding the first power voltage.

8. The dual-function driver as claimed in claim 7, wherein the well controller comprises:
an eighth transistor coupled between the first power voltage and the n-well, comprising a control terminal coupled to the first output terminal;
a ninth transistor coupled between the first power voltage and the n-well, comprising a control terminal coupled to the second output terminal;
a tenth transistor coupled between the n-well and the first output terminal, comprising a control terminal coupled to the first power voltage; and
an eleventh transistor coupled between the n-well and the second output terminal, comprising a control terminal coupled to the first power voltage.

9. The dual-function driver as claimed in claim 7, wherein the first and second gate controllers are coupled to the well controller, disabling the first and second transistors in response to a mode selection signal in the second mode.

10. The dual-function driver as claimed in claim 9, wherein the first and second gate controllers each comprise:
a twelfth transistor comprising a first terminal coupled to the second power voltage, a control terminal coupled to the mode selection signal, and a second terminal;
a thirteenth transistor comprising a first terminal coupled to the second terminal of the twelfth transistor, a control terminal coupled to the first power voltage, and a second terminal;
a fourteenth transistor comprising a first terminal coupled to the second terminal of the thirteenth transistor, a control terminal coupled to the first power voltage, and a second terminal coupled to the n-well; and
a fifteenth transistor comprising a first terminal coupled to the second terminal of the fourteenth transistor, a control terminal coupled to the first power voltage, and a second terminal, wherein the second terminals of the fifteenth transistors in the first and second gate controllers are coupled to the control terminals of the first and second transistors respectively.

11. A dual-function driver, comprising:
a current steering circuit comprising first, second, third and fourth transistors; and
an input control unit receiving a first input signal compliant with a low voltage differential signaling (LVDS) specification in a first mode and a second input signal compliant with a transmission minimized differential signaling (TMDS) specification in a second mode by sharing a pair of input terminals, wherein the input control unit controls the first, second, third and fourth transistors to act as a LVDS driver outputting a first differential signal compliant with the LVDS specification through a pair of output terminals in response to the first input signal during the first mode, and the input control unit controls turns off the first and second transistors and controls the third and fourth transistors to act as a TMDS driver outputting a second differential signal compliant with the TMDS specification through the pair of output terminals in response to the second input signal during the second mode;
wherein the first and second transistors are PMOS transistors and the third and fourth transistors are NMOS transistors.

12. The dual-function driver as claimed in claim 11, wherein the current steering circuit further comprises:
a fixed current source coupled between a first power voltage and the first and second transistors; and a selectable current source coupled between the third and fourth transistors and a second power voltage;

wherein the selectable current source provides a first current in the first mode and a second current exceeding the first current in the second mode.

13. The dual-function driver as claimed in claim 11, wherein the input control unit comprises first and second gate control units disabling the first and second transistors during the second mode in response to a mode selection signal.

14. The dual-function driver as claimed in claim 13, further comprising a clamping device coupled between the pair of output terminals and the third and fourth transistors, wherein the clamping device comprises fifth and sixth transistors with control terminals coupled to a first power voltage.

15. The dual-function driver as claimed in claim 11, further comprising a floating well controller coupled to the pair of output terminals, charging n-well of the PMOS transistors based on the first power voltage or an external power voltage exceeding the first power voltage.

16. A dual-function driver, comprising:

an input control unit receiving a first input signal compliant with a first specification in a first mode and a second input signal compliant with a second specification in a second mode by sharing a pair of input terminals; and a current steering circuit comprising first and second differential pairs, wherein the input control unit enables the first and second differential pairs to output a first differential signal compliant with the first specification through a pair of output terminals during the first mode, and the input control unit disables the first differential pair and enables the second differential pair to output a second differential signal compliant with the second specification on the pair of output terminals during the second mode, and the first and second specifications are different specifications applied for digital visual interface;

wherein the first differential pair comprises PMOS transistors and the second differential pair comprises NMOS transistors.

17. The dual-function driver as claimed in claim 16, further comprising a clamping device coupled between the pair of output terminals and the second differential pair, and comprising first and second transistors with control terminals coupled to a first power voltage, such that the second differential pair is not stressed by an external power voltage.

18. The dual-function driver as claimed in claim 16, further comprising a floating well controller coupled to the pair of output terminals, charging n-well of the PMOS transistors in the first differential pair based on the first power voltage or an external power voltage exceeding the first power voltage.

19. The dual-function driver as claimed in claim 16, wherein the input control unit comprises:

first and second gate control units, disabling the first differential pair in response to a mode selection signal during the second mode;

first, second, third and fourth transmission gates coupled between input terminals of the first and second differential pairs and the pair of input terminals; and a plurality of buffers coupled between the transmission gates and the pair of input terminals, buffering the first input signal during the first mode and the second input signal during the second mode.

20. The dual-function driver as claimed in claim 16, wherein the current steering circuit further comprises:

a fixed current source coupled between a first power voltage and the first differential pair; and a selectable current source coupled between the second differential pair and a second power voltage, providing a first current in the first mode and a second current exceeding the first current in the second mode.

* * * * *